US012654604B2

(12) United States Patent
Furuta

(10) Patent No.: US 12,654,604 B2
(45) Date of Patent: Jun. 16, 2026

(54) CONTROL DEVICE FOR VEHICLE

(71) Applicant: TOYOTA JIDOSHA KABUSHIKI KAISHA, Toyota (JP)

(72) Inventor: Hiroki Furuta, Sunto-Gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 18/489,313

(22) Filed: Oct. 18, 2023

(65) Prior Publication Data

US 2024/0198871 A1    Jun. 20, 2024

(30) Foreign Application Priority Data

Dec. 20, 2022    (JP) ................................. 2022-203338

(51) Int. Cl.
B60N 2/50         (2006.01)

(52) U.S. Cl.
CPC .............. B60N 2/501 (2013.01); B60N 2/502 (2013.01)

(58) Field of Classification Search
CPC ......... B60N 2/501; B60N 2/502; B60N 5/544
See application file for complete search history.

(56) References Cited

U.S. PATENT DOCUMENTS

| | | | |
|---|---|---|---|
| 6,059,253 A | 5/2000 | Koutsky et al. | |
| 7,168,709 B2 * | 1/2007 | Niwa ................. | B60G 17/0165 701/1 |

| | | | |
|---|---|---|---|
| 7,578,193 B2 * | 8/2009 | Davidson ................. | G01H 1/00 73/661 |
| 7,648,193 B2 * | 1/2010 | Fujiwara ............ | B62D 33/0604 296/190.07 |
| 8,095,268 B2 * | 1/2012 | Parison .................. | B60N 2/505 267/140.5 |
| 8,308,216 B2 * | 11/2012 | Bertozzi .............. | B60N 2/0031 296/65.02 |
| 8,342,541 B2 * | 1/2013 | Wurmthaler ........... | B60N 2/508 280/124.157 |
| 8,725,351 B1 * | 5/2014 | Selden .................. | F16F 15/002 318/672 |
| 9,975,582 B2 * | 5/2018 | Rausch .............. | B62D 33/0608 |
| 10,035,439 B2 * | 7/2018 | Knox .................... | F16F 15/002 |
| 10,174,473 B2 * | 1/2019 | D'Andrea ................. | E01H 5/06 |

(Continued)

FOREIGN PATENT DOCUMENTS

| | | |
|---|---|---|
| JP | H10-203221 A | 8/1998 |
| JP | 2006-509673 A | 3/2006 |

(Continued)

*Primary Examiner* — Fadey S. Jabr
*Assistant Examiner* — Ashutosh Pande
(74) *Attorney, Agent, or Firm* — Sughrue Mion, PLLC

(57)         ABSTRACT

A control device for a vehicle includes: a carrier installed on a vehicle and on which an occupant or an object to be conveyed is placed; an active suspension disposed between the carrier and a body of the vehicle and capable of controlling a force that acts between the carrier and the vehicle body; a vibration detector configured to detect a vibration state of the vehicle body; and a controller configured to calculate, based on a detection result of the vibration detector, a corresponding-position state amount indicating the vibration state of a portion of the vehicle body corresponding to a position where the carrier is disposed and control the active suspension based on the corresponding-position state amount.

6 Claims, 5 Drawing Sheets

(56) References Cited

U.S. PATENT DOCUMENTS

| | | | | |
|---|---|---|---|---|
| 10,245,987 | B2 * | 4/2019 | Castillo | B60N 2/502 |
| 10,369,908 | B2 * | 8/2019 | Knox | B60K 5/12 |
| 10,675,999 | B2 * | 6/2020 | Knox | B60N 2/38 |
| 11,541,797 | B2 * | 1/2023 | Dhaens | B60G 17/06 |
| 11,959,249 | B2 * | 4/2024 | Selvam | E02F 9/166 |
| 12,122,271 | B2 * | 10/2024 | Knox | B60N 2/501 |
| 12,145,490 | B2 * | 11/2024 | Legh | B60N 2/90 |
| 12,533,924 | B2 * | 1/2026 | Furuta | B60G 17/0182 |
| 2003/0125857 | A1 * | 7/2003 | Madau | B60G 17/019 |
| | | | | 701/37 |
| 2004/0046335 | A1 * | 3/2004 | Knox | B60G 17/0165 |
| | | | | 280/5.5 |
| 2006/0261647 | A1 | 11/2006 | Maas et al. | |
| 2016/0082870 | A1 | 3/2016 | Fujita et al. | |
| 2017/0043692 | A1 * | 2/2017 | Okubo | B60N 2/809 |
| 2019/0383345 | A1 * | 12/2019 | Hamaguchi | F16F 15/002 |
| 2021/0221258 | A1 * | 7/2021 | Ekchian | B60N 2/809 |

FOREIGN PATENT DOCUMENTS

| | | | | |
|---|---|---|---|---|
| JP | 2014-213753 | A | 11/2014 | |
| JP | 2021-079953 | A | 5/2021 | |
| WO | WO-2018065505 | A1 * | 4/2018 | B60N 2/502 |

* cited by examiner

START

S21 — BODY STATE AMOUNT CALCULATING PROCESS

S22 — CORRESPONDING-POSITION STATE AMOUNT CALCULATING PROCESS

S23 — CARRIER STATE AMOUNT CALCULATING PROCESS

S24 — LOWER-SIDE CONTROL AMOUNT CALCULATING PROCESS

S25 — UPPER-SIDE CONTROL AMOUNT CALCULATING PROCESS

S26 — CONTROL EXECUTING PROCESS

RETURN

CONTROL DEVICE FOR VEHICLE

REFERENCE TO RELATED APPLICATIONS

This application claims priority from Japanese Patent Application No. 2022-203338 filed on Dec. 20, 2022. The entire content of the priority application is incorporated herein by reference.

BACKGROUND ART

The present disclosure relates to control device for a vehicle.

An active suspension is disposed in some cases between a seat and a body of a vehicle to suppress vibration of the seat. The active suspension is configured to control a force that acts between the seat and the vehicle body. A controller controls the active suspension so as to suppress vibration of the seat in response to vibration input to the seat. For instance, JP-A-No. 2006-509673 describes an active suspension provided for a seat and having two degrees of freedom of motion.

DESCRIPTION

A conventional active suspension is controlled based on a detection value of an acceleration sensor disposed on a seat. In such control, however, active suspension can be controlled only after the seat is vibrated, thus leaving a room for improvement in terms of response of the control for vibration suppression. Improvement in response of vibration damping control is an issue in the control of an active suspension provided for a carrier of a vehicle such as a seat, a bed, a floor, or a base.

Accordingly, an aspect of the present disclosure relates to a control device for a vehicle capable of controlling responsively an active suspension provided for a carrier.

In one aspect of the present disclosure, a control device for a vehicle includes: a carrier installed on a vehicle and on which an occupant or an object to be conveyed is placed; an active suspension disposed between the carrier and a body of the vehicle and capable of controlling a force that acts between the carrier and the vehicle body; a vibration detector configured to detect a vibration state of the vehicle body; and a controller configured to calculate, based on a detection result of the vibration detector, a corresponding-position state amount indicating the vibration state of a portion of the vehicle body corresponding to a position where the carrier is disposed and control the active suspension based on the corresponding-position state amount.

According to the present disclosure, the corresponding-position state amount is calculated based on the detection result of the vibration detector, making it possible to estimate or predict how the carrier vibrates. The corresponding-position state amount is a displacement amount, a speed, or acceleration, at the portion of the vehicle body corresponding to the carrier. The vibration input to the vehicle body is transmitted to the carrier via the active suspension. That is, the vibration input to the tire during traveling of the vehicle is transmitted to the vehicle body before transmitted to the carrier. As compared with the conventional configuration in which the active suspension is controlled based on the detection result of the sensor provided for the carrier, the configuration according to the present disclosure in which the active suspension is controlled based on the result of detection of the vibration of the vehicle body allows the active suspension to be controlled at earlier timing, namely, responsively. Further, the configuration according to the present disclosure eliminates a need to provide sensors for the carrier, resulting in a reduction in the number of sensors installed on the vehicle.

The objects, features, advantages, and technical and industrial significance of the present disclosure will be better understood by reading the following detailed description of an embodiment, when considered in connection with the accompanying drawings, in which.

Figure 1:
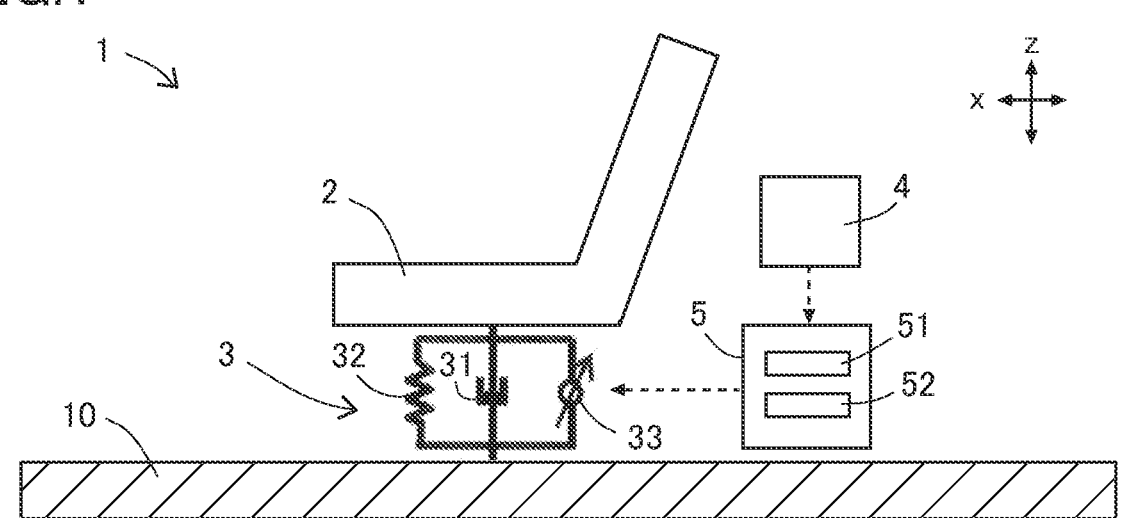
FIG. 1 is a view illustrating a configuration of a control device for a vehicle according to one embodiment of the present disclosure.

Referring to the drawings, there will be hereinafter described in detail a control device for a vehicle (hereinafter referred to as "vehicle control device" where appropriate) according to one embodiment of the present disclosure. It is to be understood that the present disclosure is not limited to the details of the following embodiment but may be embodied with various changes and modifications based on the knowledge of those skilled in the art. The vehicle in the present embodiment is a four-wheeled vehicle having a front left wheel $9fl$, a front right wheel $9fr$, a rear left wheel $9rl$, and a rear right wheel $9rr$. The front left wheel $9fl$, the front right wheel $9fr$, the rear left wheel $9rl$, and the rear right wheel $9rr$ will be collectively referred to as the wheel 9 where appropriate. The front left wheel $9fl$ and the front right wheel $9fr$ will be collectively referred to as the front wheel $9f$ where appropriate, and the rear left wheel $9rl$ and the rear right wheel $9rr$ will be collectively referred to as the rear wheel $9r$ where appropriate. A sprung portion of the vehicle refers to, for instance, a portion of the vehicle including a vehicle body 10 and supported by suspensions (undercarriage suspensions) each of which is disposed between each wheel 9 and the vehicle body 10. An unsprung portion of the vehicle refers to, for instance, a portion of the vehicle located lower than coil springs of the undercarriage suspensions, the portion being undercarriage components, for instance.

As illustrated in FIG. 1, the vehicle control device 1 includes a seat 2, which functions as a carrier, an active suspension 3, a vibration detector 4, and a controller 5. The carrier is a component installed on the vehicle and on which an occupant or an object to be conveyed is placed. The carrier may be a component that supports, in the vehicle compartment, an occupant or an object to be conveyed, for instance. In the present embodiment, the carrier is the seat 2 on which occupant sits. Other than the seat 2, the carrier may be a bed on which an occupant is laid down in the vehicle (such as an ambulance), a floor of the vehicle compartment, or a base on which precision machinery or the like (the object to be conveyed) is placed.

The active suspension 3 is disposed between the seat 2 and the vehicle body 10. The active suspension 3 is disposed on a bottom forming member of the vehicle body 10, for instance. The active suspension 3 can control a force that acts between the seat 2 and the vehicle body 10. The active suspension 3 can control at least one of a relative position of the seat 2 to the vehicle body 10 (such as a moving force or a holding force), a damping force between the vehicle body 10 and the seat 2, and a spring constant (elastic force) between the vehicle body 10 and the seat 2. The active suspension 3 of the present embodiment can adjust a displacement amount of the seat 2 relative to the vehicle body, for instance. The seat 2 connected to the active suspension 3 is referred to as an active seat.

One example of the active suspension 3 will be conceptually explained. The active suspension 3 includes a shock absorber 31 as a damper element, a suspension spring 32 as a spring element, and an actuator 33. The actuator 33 is configured to be capable of changing the relative position of the seat 2 to the vehicle body 10 in the up-down direction. The seat 2 moves in the up-down direction driven by the actuator 33. The actuator 33 includes an electric motor that functions as a drive source and a speed reduction mechanism. The drive source of the actuator 33 may be a hydraulic type. One or more actuators 33 are disposed for one seat 2. The active suspension 3 includes the actuator 33 capable of changing the position of the seat 2 in the up-down direction. If a plurality of actuators 33 is disposed for one seat 2 so as to be spaced apart from each other, the seat 2 is allowed to be inclined. This can deal with swing in a roll direction or swing in a pitch direction.

The shock absorber 31 generates a damping force between the vehicle body 10 and the seat 2. The shock absorber 31 may be a variable type capable of changing the damping force (that may be a damping coefficient or a damping ratio) or may be a non-variable type incapable of changing the damping force. The suspension spring 32 generates an elastic force between the vehicle body 10 and the seat 2 based on a spring constant. The suspension spring 32 may be a variable spring constant type or a non-variable spring constant type. The active suspension 3 may include, for instance, a link mechanism (such as a pantograph configuration) that allows a movable portion of the seat 2 to have freedom only in the up-down direction. In this instance, the actuator 33 may be connected in parallel to the shock absorber 31 and the suspension spring 32 that act on the operation of the link mechanism.

Figure 2:
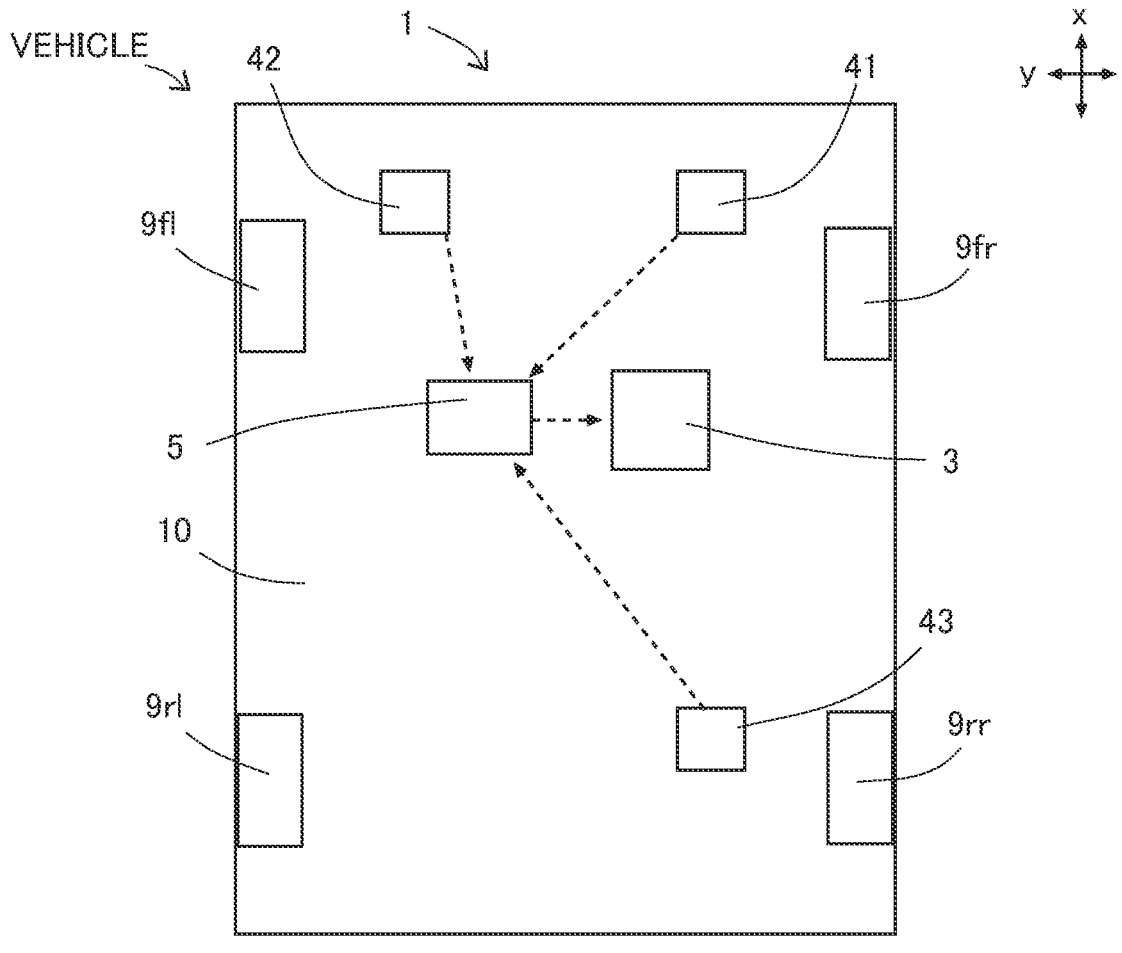
FIG. 2 is a conceptual view illustrating a layout of a vibration detector in the embodiment.

The vibration detector 4 detects a vibration state, i.e., a state amount, of the vehicle body 10. The vibration state can be represented by acceleration, a speed, or a displacement amount in the up-down direction. The vibration detector 4 is a vehicle-mounted sensor and disposed on the vehicle body 10, for instance. As illustrated in FIG. 2, the vibration detector 4 of the present embodiment includes three acceleration sensors 41, 42, 43 each for detecting the acceleration in the up-down direction. The acceleration sensors 41-43 are disposed on the vehicle body 10 so as to be spaced apart from each other. The acceleration sensor 41 is disposed at a front right portion of the vehicle body 10. The acceleration sensor 42 is disposed at a front left portion of the vehicle body 10. The acceleration sensor 43 is disposed at a rear right portion or a rear left portion of the vehicle body 10 (e.g., the rear right portion in FIG. 2). At least three acceleration sensors 41-43 are provided for the vehicle body 10. By regarding the vehicle body 10 as a rigid body, the state amount of a given plane of the vehicle body 10 can be calculated. The state amount is the acceleration, the speed, or the displacement amount at least in the up-down direction. Details will be later explained.

The controller 5 is constituted by an electronic control unit (ECU) including at least one processor 51 and at least one memory 52. The memory 52 is communicably connected to the processor 51. The memory 52 may be an internal or external memory. The controller 5 is communicably connected to the active suspension 3 and the vibration detector 4. When a seating sensor for determining whether an occupant is seated on the seat 2 determines occupant's seating on the seat 2, the controller 5 controls the active suspension 3 corresponding to the seat 2 for which occupant's seating is determined.

The controller 5 is configured to control the active suspension 3 based on the detection result of the vibration detector 4. The controller 5 controls the active suspension 3 to reduce the vibration of the seat 2. Specifically, the controller 5 calculates, based on the detection result of the vibration detector 4, a "corresponding-position state amount" indicating the vibration state of a portion of the vehicle body 10 corresponding to the position where the seat 2 is disposed. The controller 5 controls the active suspension 3 based on the corresponding-position state amount. Hereinafter, the portion of the vehicle body 10 corresponding to the position where the seat 2 is disposed will be referred to as a "seat corresponding position" where appropriate. The seat corresponding position may be a portion of the vehicle body 10 located under the seat 2 or a portion of the vehicle body 10 where the active suspension 3 is fixed. The corresponding-position state amount is the state amount of the seat corresponding position. In a case where the carrier is a component other than the seat 2, the concept of the "corresponding position" is the same as described above with respect to the seat 2. That is, the corresponding position may be a portion of the vehicle body 10 located under the carrier or a portion of the vehicle body 10 where the active suspension 3 is fixed.

The controller 5 controls the actuator 33 to control the relative position of the seat 2 in the up-down direction. The controller 5 sets a current value of a control current supplied to the actuator 33. The controller 5 supplies the control current to the electric motor of the actuator 33 via a drive circuit (not illustrated). The current value of the control current correlates with an expansion and contraction amount of the actuator 33. The expansion and contraction amount of the actuator 33, namely, the displacement amount of the seat 2 caused by the operation of the actuator 33, can be referred to as a control amount of the actuator 33.

Figure 3:
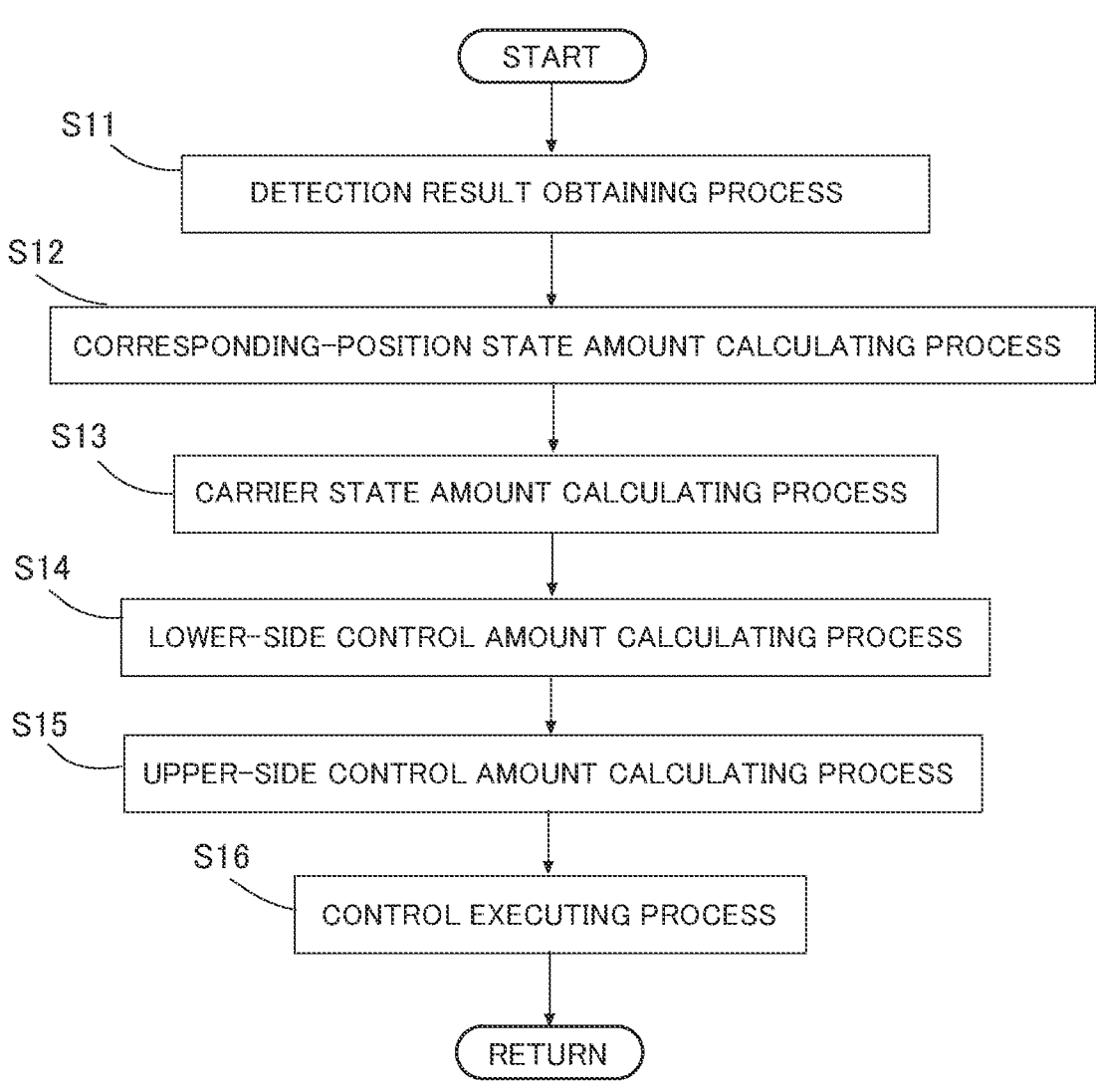
FIG. 3 is a flowchart representing processing in the embodiment.

As illustrated in FIG. 3, the controller 5 is configured to execute a detection result obtaining process S11, a corresponding-position state amount calculating process S12, a carrier state amount calculating process S13, a lower-side control amount calculating process S14, an upper-side control amount calculating process S15, and a control executing process S16. In the detection result obtaining process S11, the controller 5 obtains the detection result (the detection value) from the vibration detector 4.

In the corresponding-position state amount calculating process S12, the controller 5 calculates the corresponding-position state amount based on the detection result of the vibration detector 4. In the carrier state amount calculating process S13, the controller 5 calculates the carrier state amount, which represents the vibration state of the seat 2, based on the corresponding-position state amount.

In the lower-side control amount calculating process S14, the controller 5 calculates a lower-side control amount, which is the control amount of the active suspension 3 for dealing with the vibration input to the seat 2 from the vehicle body 10, based on the corresponding-position state amount and a predetermined lower-side gain. In the upper-side control amount calculating process S15, the controller 5 calculates an upper-side control amount, which is the control amount of the active suspension 3 for dealing with the vibration of the seat 2, based on the carrier state amount and a predetermined upper-side gain. In the control executing process S16, the controller 5 controls the active suspension 3 based on the lower-side control amount and the upper-side control amount. The predetermined lower-side gain may be one or more gains. The predetermined upper-side gain may be one or more gains.

Concrete examples of the calculating processes S12-S15 will be described. In the corresponding-position state amount calculating process S12, calculation is performed regarding the vehicle body 10 as the rigid body. Since the vehicle body 10 is treated as the rigid body in the calculation, the displacement amount of the seat corresponding position in the up-down direction, namely, the corresponding-position state amount, can be calculated based on the detection results of the three acceleration sensors 41-43 disposed on the vehicle body 10, namely, the sprung portion. The corresponding-position state amount is calculated based on the following expressions (1), (2), (3), (4), and (5), for instance. In the coordinate system, the x direction is the vehicle travel direction (the front-rear direction of the vehicle), the y direction is the right-left direction, and the z direction is the up-down direction.

$$M = \begin{bmatrix} L_1 & W_1 & 1 \\ L_2 & W_2 & 1 \\ L_3 & W_3 & 1 \end{bmatrix}^{-1} \tag{1}$$

$$\ddot{Z}_g = \sum_{i=1}^{3} \{M(1, i)L_g + M(3, i)\}\ddot{Z}_i \tag{2}$$

$$\Phi_g = -\sum_{i=1}^{3} \{M(2, i)\}\ddot{Z}_i \tag{3}$$

$$\Theta_g = \sum_{i=1}^{3} M(1, i)\ddot{Z}_i \tag{4}$$

$$\ddot{z}_{se1} = \ddot{Z}_g + W_4\Phi_g + L_4\Theta_g \tag{5}$$

$L_1$ is a position of the acceleration sensor 41 in the x direction. $W_1$ is a position of the acceleration sensor 41 in the y direction. $L_2$ is a position of the acceleration sensor 42 in the x direction. $W_2$ is a position of the acceleration sensor 42 in the y direction. $L_3$ is a position of the acceleration sensor 43 in the x direction. $W_3$ is a position of the acceleration sensor 43 in the y direction. $L_4$ is a position of the seat 2 in the x direction. $W_4$ is a position of the seat 2 in the y direction. $L_g$ is a position of the center of gravity of the vehicle body 10 in the x direction. $Z_1$" is acceleration in the z direction detected by the acceleration sensor 41. $Z_2$" is acceleration in the z direction detected by the acceleration sensor 42. $Z_3$" is acceleration in the z direction detected by the acceleration sensor 43. $Z_g$" is acceleration in the z direction at the center of gravity of the vehicle body 10. $\Phi_g$ is roll acceleration at the position of the center of gravity of the vehicle body 10. $\Theta_g$ is pitch acceleration at the position of the center of gravity of the vehicle body 10. $Z_{se1}$" is acceleration in the z direction at the seat corresponding position. Here, """ represents first-order time derivative, and """" represents second-order time derivative.

In the corresponding-position state amount calculating process S12, acceleration $Z_{se1}$" in the z direction at the seat corresponding position is calculated as the corresponding-position state amount according to the expressions (1)-(5). By first-order time integrating $Z_{se1}$", a speed $Z_{se1}$' in the z direction at the seat corresponding position is obtained. By second-order time integrating $Z_{se1}$", a displacement amount $Z_{se1}$ in the z direction at the seat corresponding position is obtained. $Z_{se1}$", $Z_{se1}$', and $Z_{se1}$ are the corresponding-position state amounts. The controller 5 calculates $Z_{se1}$ as the corresponding-position state amount to be utilized in the carrier state amount calculating process S13 based on $Z_{se1}$" calculated based on the detection result of the vibration detector 4. The center of gravity of the vehicle body 10 may be referred to as the center of gravity of the sprung portion.

In the carrier state amount calculating process S13 of the present embodiment, the calculation is performed assuming that the active suspension 3 is configured by one actuator 33, one shock absorber 31, and one suspension spring 32 that are connected in parallel between one seat 2 and the vehicle body 10. The configuration and the model of the active suspension 3 assumed in the calculation may be changed depending on the processing capability of the controller 5. The model is, for instance, n degree of freedom vibration model (n: natural number).

$$m_{se}z_{se2}s^2 = (c_{se}s + k_{se})(z_{se1} - z_{se2}) + F_{se} \tag{6}$$

Since the corresponding-position state amount $Z_{se1}$ is calculated as described above, the controller 5 can calculate the displacement amount of the seat 2 in the z direction, i.e., "carrier state amount", according to the equation of motion of (6). Here, $m_{se}$ is a total of the mass of the seat 2 and the mass of the occupant seated on the seat 2 (hereinafter simply referred to as "seat total mass where appropriate). The mass of the occupant is set to a predetermined value. $Z_{se1}$ is the corresponding-position state amount, namely, the displacement amount of the seat corresponding position in the z direction. $Z_{se2}$ is the carrier state amount, namely, the displacement amount of the seat 2 in the z direction. $C_{se}$ is a damping coefficient of the shock absorber 31. $k_{se}$ is a spring constant of the suspension spring 32. The characteristics such as the damping coefficient and the spring constant of the active suspension 3 are set beforehand. $F_{se}$ is a control amount of the actuator 33 at the time of calculation, and s is Laplace operator.

In the lower-side control amount calculating process S14, the controller 5 multiplies the corresponding-position state amount $Z_{se1}$ by a gain to calculate the control amount of the actuator 33. The controller 5 calculates, according to the expression (7), the control amount of the actuator 33 to suppress the vibration of the seat 2, i.e., the lower-side control amount, for the input to the seat 2 from the vehicle body 10 (that may be referred to as the vibration under the seat 2). $F_{se1}$ is the lower-side control amount. $\alpha_1$ is a speed term gain. $\beta_1$ is a displacement term gain. The gains are set within respective ranges of $0 < \alpha_1 \leq 1$ and $0 < \beta_1 \leq 1$, for instance.

$$F_{se1} = \alpha_1 c_{se} z_{se1} s + \beta_1 k_{se} z_{se1} \qquad (7)$$

In the upper-side control amount calculating process S15, the controller 5 multiplies the carrier state amount $Z_{se2}$ by a gain to calculate the control amount of the actuator 33. The controller 5 calculates, according to the expression (8), the control amount of the actuator 33 to suppress the vibration of the seat 2, i.e., the upper-side control amount, for the state of the seat 2. $F_{se2}$ is the upper-side control amount, $\alpha_2$ is a speed term gain, and $\beta_2$ is a displacement term gain.

$$F_{se2} = \alpha_2 c_{se} z_{se2} s + \beta_2 k_{se} z_{se2} \qquad (8)$$

In the control executing process S16, the lower-side control amount $F_{se1}$ and the upper-side control amount $F_{se2}$ are added as indicated by the following expression (9), so that the control amount $F_{se}$ of the actuator 33 is calculated. The controller 5 controls the actuator 33 based on the control amount $F_{se}$.

$$F_{se} = F_{se1} + F_{se2} \qquad (9)$$

According to the present embodiment, the corresponding-position state amount is calculated based on the detection result of the vibration detector 4, namely, the state amount of the vehicle body 10. Since the state amount of the vehicle body 10 at the positon corresponding to the seat 2 is calculated, the controller 5 can estimate or predict, namely, calculate, how the seat 2 vibrates. The corresponding-position state amount is, for instance, a displacement amount, a speed or acceleration at the portion of the vehicle body 10 corresponding to the seat 2. The vibration input to the vehicle body 10 is transmitted to the seat 2 via the active suspension 3. That is, the vibration input to the tire during traveling of the vehicle is transmitted to the vehicle body 10 before transmitted to the seat 2. Accordingly, the configuration according to the present embodiment in which the active suspension 3 is controlled based on the result of detection of the vibration of the vehicle body 10 allows the active suspension 3 to be controlled at earlier timing, as compared with the conventional configuration in which the active suspension is controlled based on the detection result of the sensor provided for the seat. That is, the present embodiment enables the active suspension 3 to be responsively controlled. The controller 5 can start to control the active suspension 3 before the seat 2 vibrates.

By utilizing the corresponding-position state amount calculated based on the vibration state of the vehicle body 10 in the control of the active suspension 3, the control response can be improved. Further, the present embodiment eliminates a need of providing the sensor for the seat 2, resulting in a reduction in the number of sensors mounted on the vehicle and a reduction in the sensor installation space.

The conventional configuration suffers from a delay in the control system in addition to a delay in the vibration detection, causing a concern about a reduction in the vibration damping effect and the system stability. According to the present embodiment, such reduction in the vibration damping effect and the system stability can be prevented by the improvement in the control response. In a case where the acceleration sensor is provided for each of the plurality of seats 2, a multiplicity of sensors is required for one vehicle depending on the freedom to be controlled. This causes a concern about an increase in cost and installation space. According to the present embodiment, the vibration state of the vehicle body 10 needs to be detected, and the sensors need not be provided for each seat 2, thus resulting in a reduction in cost and installation space. The vibration state of the vehicle body 10 can be detected by existing sensors. The controller 5 can execute the processes S11-S16 for the active suspension 3 provided for each of the plurality of seats 2.

The controller 5 may control the active suspension 3 based on the lower-side control amount without utilizing the upper-side control amount. In this instance, the carrier state amount calculating process S13 and the upper-side control amount calculating process S15 are unnecessary. This also can improve the control response. The controller 5 may control the active suspension 3 based on the upper-side control amount without utilizing the lower-side control amount. In this instance, the lower-side control amount calculating process S14 is unnecessary. This also can improve the control response. Thus, the controller 5 may control the active suspension 3 based on at least one of the lower-side control amount and the upper-side control amount. It is noted, however, that more improved control accuracy is attained by utilizing both the lower-side control amount and the upper-side control amount.

As long as the vibration detector 4 detects the vibration state of the vehicle body 10, the vibration detector 4 may be an existing sensor. The acceleration sensor installed on the vehicle body 10 for another use may be utilized as the vibration detector 4. For instance, in a case where the undercarriage suspension is an active suspension, the acceleration sensor of the sprung portion used in the control of the undercarriage suspension may be used as the vibration detector 4.

Further, other existing sensor such as the vehicle height sensor or the acceleration sensor of the unsprung portion may be used as the vibration detector 4. In this instance, the controller 5 may execute state estimation by an observer or the like based on the detection result of other existing sensor and may use the estimation value calculated by the observer as the detection value of the vibration detector 4. The vibration detector 4 may be constituted by four or more acceleration sensors provided for the vehicle body 10.

In a case where the seat 2 is provided with the acceleration sensor, for instance, the control accuracy can be enhanced utilizing not only the calculation result in each process but also the detection result of the acceleration sensor of the seat 2 in question. The closer the sensor is positioned to the seat 2, the higher the robustness. The farther the sensor is positioned from the seat 2, the more advantageous in response. Accordingly, the control amount based on the detection value of the sensor provided for the seat 2 and the control amount based on the detection value of the sensor provided for the vehicle body 10 are added, thus enabling the control with good balance.

The direction of the control by the actuator 33 of the active suspension 3 is not limited to the up-down direction. For instance, provision of two or more actuators 33 for one seat 2 allows the control in the roll direction and/or the pitch direction. The controller 5 can execute, for such active suspension 3, the control similar to that described above. Known configurations of the active suspension 3 are employable. The controller 5 can execute computing processing in accordance with the configuration (model) of the active suspension 3.

Road Surface Information Obtaining Device

Figures 4, 5:
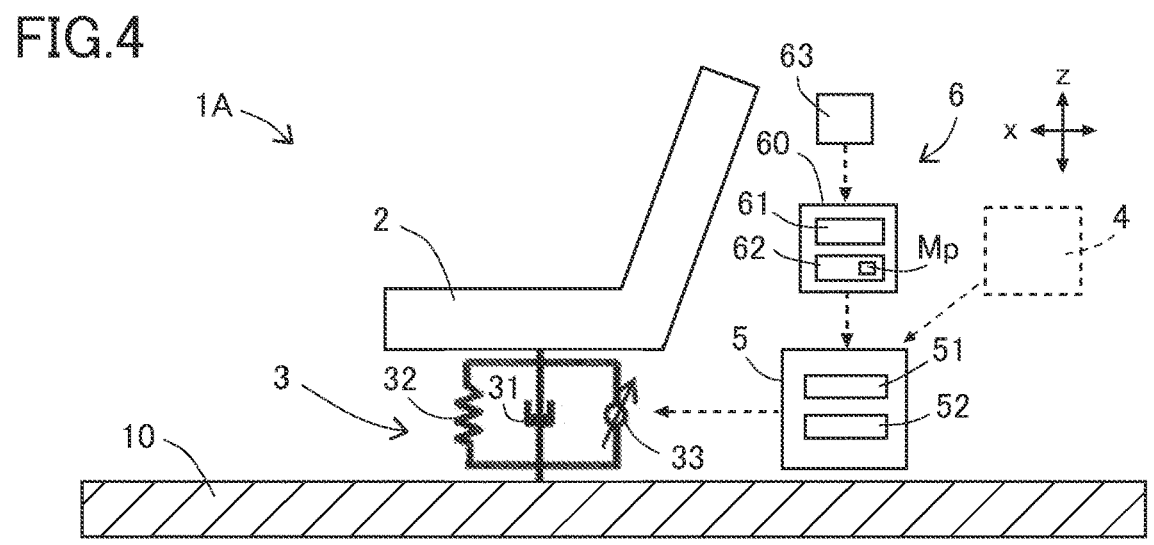
FIG. 4 is a view illustrating a configuration of the control device including a road surface information obtaining device in the embodiment.
FIG. 5 is a flowchart representing processing in the embodiment.

There will be next described an example in which the vehicle control device includes a road surface information obtaining device 6, in place of or in addition to the vibration detector 4. As illustrated in FIG. 4, the vehicle control device 1A includes the seat 2, which is the carrier, the active suspension 3, the controller 5, and the road surface information obtaining device 6. Control of each undercarriage suspension utilizing the road surface information obtaining device 6 is referred to as a preview vibration damping control.

The road surface information obtaining device 6 is configured to obtain road surface information that is information relating to a displacement in the up-down direction of the road surface on which a predetermined subject wheel is scheduled to travel. In this example, all the wheels 9 are set as the subject wheels. The road surface information includes, for instance, a displacement of the road surface in the up-down direction, a speed (i.e., time derivative value of the displacement), and/or acceleration (i.e., time derivative value of the speed). The road surface information may include information other than the information relating to the displacement of the road surface in the up-down direction.

The road surface information obtaining device 6 includes an electronic control unit 60 (hereinafter referred to as "ECU 60") including at least one processor (corresponding to "computing device") 61 and at least one memory (corresponding to "storage device") 62. The memory 62 is communicably connected to the processor 61. The memory 62 may be an internal or external memory. The ECU 60 and the controller 5 may be constituted by a common ECU. For instance, the processor 51 may also perform the functions of the processor 61, and the memory 52 may also perform the functions of the memory 62. In this instance, the road surface information obtaining device 6 is constituted by the controller 5 and a receiver 63 that will be later described.

The memory 62 stores road surface information map Mp including map information and the road surface information related to the map information. The road surface information in the road surface information map Mp of the present embodiment is an unsprung state amount that is a state amount of the unsprung portion of the vehicle. That is, the unsprung state amount and a position on the map are related to (associated with) each other in the road surface information map Mp. In the road surface information map Mp, information on the unsprung state amount is associated with each of areas of the map information in which each road is divided into the areas each having a predetermined shape. By referring to the road surface information map Mp, the unsprung state amount for a given position on the map can be grasped when the vehicle travels the given position. The unsprung state amount is, for instance, the unsprung displacement amount in the up-down direction, the unsprung speed in the up-down direction or unsprung acceleration in the up-down direction, for each wheel 9.

The road surface information obtaining device 6 can obtain the unsprung state amount when the vehicle travels by X m or after t seconds, based on the road surface information map Mp and the positional information of the own vehicle. The road surface information obtaining device 6 includes a receiver 63 installed on the vehicle to receive the positional information of the vehicle from artificial satellites. The receiver 63 is a receiver of the Global Navigation Satellite System (GNSS). The road surface information obtaining device 6 calculates the unsprung state amount after t seconds based on, for instance, the road surface information map Mp, the position of the own vehicle, the travel direction of the own vehicle, and the speed of the own vehicle. The road surface information obtaining device 6 transmits the information on the unsprung state amount to the controller 5. Based on the unsprung state amount corresponding to the road surface condition after t seconds, the controller 5 controls the active suspension 3 such that the vibration of the seat 2 after t seconds can be suppressed. It is noted that the unsprung state amount of each front wheel 9f after t seconds may differ from the unsprung state amount of each rear wheel 9r after t seconds in some cases.

The road surface information obtaining device 6 may obtain the positional information and a scheduled travel route of the own vehicle from a navigation device of the vehicle. Based on the thus obtained information, the vehicle speed information, and the road surface information map Mp, the unsprung state amount after t seconds may be obtained. The road surface information obtaining device 6 may include a navigation device.

The road surface information obtaining device 6 may receive part of the road surface information map Mp (such as the road surface information map Mp around the own vehicle) from a storage device outside the vehicle that is communicable with the vehicle such as a server or the like in a control center. In this instance, the memory 62 stores (e.g., temporarily) the received part of the road surface information map Mp such as the road surface information map Mp around the own vehicle.

As illustrated in FIG. 5, the controller 5 executes a body state amount calculating process S21, a corresponding-position state amount calculating process S22, a carrier state amount calculating process S23, a lower-side control amount calculating process S24, an upper-side control amount calculating process S25, and a control executing process S26.

In the body state amount calculating process S21, the controller 5 calculates a vibration state (state amount) of the vehicle body 10 after t seconds based on the road surface information after t seconds obtained by the road surface information obtaining device 6. Specifically, in the body state amount calculating process S21, the controller 5 calculates the sprung state amount after t seconds based on the unsprung state amount after t seconds. The road surface information includes, as the unsprung state amount after t seconds, an unsprung displacement amount $Z_{fr1}$ corresponding to the front right wheel 9fr, an unsprung displacement amount $Z_{fl1}$ corresponding to the front left wheel 9fl, an unsprung displacement amount $Z_{rr1}$ corresponding to the rear right wheel 9rr, and an unsprung displacement amount $Z_{rl1}$ corresponding to the rear left wheel 9rl.

The controller 5 calculates, as the sprung state amount, a sprung displacement amount $Z_2$, a sprung pitch angle $\theta$, and a sprung roll angle $\varphi$ according to the following expressions (10), (11), and (12). By using Laplace operator, the controller 5 calculates a sprung speed $Z_2s$ in the up-down direction, sprung acceleration $Z_2s^2$ in the up-down direction, a sprung pitch speed $\theta s$, sprung pitch acceleration $\theta s^2$, a sprung roll speed $\varphi s$, and sprung roll acceleration $\varphi s^2$. Further, the controller 5 calculates a displacement amount $Z_{fr2}$ of a portion of the sprung portion corresponding to the position of the front right wheel 9fr, a displacement amount $Z_{fl2}$ of a portion of the sprung portion corresponding to the position of the front left wheel 9fl, a displacement amount $Z_{rr2}$ of a portion of the sprung portion corresponding to the position of the rear right wheel 9rr, and a displacement amount $Z_{rl2}$ of a portion of the sprung portion corresponding to the position of the rear left wheel 9rl.

$$m_2 z_2 s^2 = (c_{sf}s + k_{sf})(z_{fl1} - z_{fl2}) + (c_{sf}s + k_{sf})(z_{fr1} - z_{fr2}) + \tag{10}$$

$$(c_{sr}s + k_{sr})(z_{rl1} - z_{rl2}) + (c_{sr}s + k_{sr})(z_{rr1} - z_{rr2})$$

$$I_y \theta s^2 = -\{(c_{sf}s + k_{sf})(z_{fl1} - z_{fl2}) + (c_{sf}s + k_{sf})(z_{fr1} - z_{fr2})\}l_f + \tag{11}$$

$$\{(c_{sr}s + k_{sr})(z_{rl1} - z_{rl2}) + (c_{sr}s + k_{sr})(z_{rr1} - z_{rr2})\}l_r$$

$$I_x \phi s^2 = \{(c_{sf}s + k_{sf})(z_{fl1} - z_{fl2}) - (c_{sf}s + k_{sf})(z_{fr1} - z_{fr2})\}T_f + \tag{12}$$

$$\{(c_{sr}s + k_{sr})(z_{rl1} - z_{rl2}) - (c_{sr}s + k_{sr})(z_{rr1} - z_{rr2})\}T_r$$

$m_2$ is a sprung mass and is set to a predetermined value. $I_x$ is roll moment of inertia of the sprung portion. $I_y$ is pitch moment of inertia of the sprung portion. Each moment of inertia is calculated based on the sprung mass (predetermined value) and specification information (such as the size of the vehicle body 10). $T_f$ is a tread of the front wheels 9f. $T_r$ is a tread of the rear wheels 9r. The tread is a center-to-center distance of ground contact areas of the right and left tires and is predetermined based on the specifications. $l_f$ is a distance between the front axle and the center of gravity of the sprung portion. $l_r$ is a distance between the rear axle and the center of gravity of the sprung portion. The front axle is an axle corresponding to the front right and left wheels 9f, and the rear axle is an axle corresponding to the rear right and left wheels 9r. The positions of the front axle and the rear axle are predetermined based on the specifications. $c_{sf}$ is a damping coefficient of the undercarriage suspension of the front wheel 9f. $k_{sf}$ is a spring constant of the undercarriage suspension of the front wheel 9f. $c_{sr}$ is a damping coefficient of the undercarriage suspension of the rear wheel 9r. $k_{sr}$ is a spring constant of the undercarriage suspension of the rear wheel 9r. The characteristics of the undercarriage suspension are the same between the front right and left wheels 9f and between the rear right and left wheels 9r. The characteristics of the undercarriage suspension are predetermined. s is Laplace operator.

In the corresponding-position state amount calculating process S22, the controller 5 calculates the corresponding-position state amount indicating the vibration state of a portion of the vehicle body 10 corresponding to the seat 2, i.e., seat corresponding position, based on the vibration state (the sprung state amount) of the vehicle body 10. The corresponding-position state amount calculating process S22 corresponds to the corresponding-position state amount calculating process S12. The controller 5 calculates acceleration $Z_{se1}''$ of the seat corresponding position in the z direction according to the following expression (5). $Z_g''$ is calculated based on $Z_2$, $Z_{fr2}$, $Z_{fl2}$, $Z_{rr2}$, and $Z_{rl2}$. $\Phi_g$ corresponds to $\varphi s^2$ calculated as described above. $\Theta_g$ corresponds to $\theta s^2$ calculated as described above. Thus, acceleration $Z_{se1}''$ of the seat corresponding position, a speed $Z_{se1}'$ of the seat corresponding position, and a displacement amount $Z_{se1}$ of the seat corresponding position are calculated as the corresponding-position state amount.

Subsequent processes S23-S26 are the same as the processes S13-S16 in FIG. 3. The carrier state amount calculating process S23 is the same as the carrier state amount calculating process S13. The lower-side control amount calculating process S24 is the same as the lower-side control amount calculating process S14. The upper-side control amount calculating process S25 is the same as the upper-side control amount calculating process S15. The control executing process S26 is the same as the control executing process S16, and the timing of control execution is timing that allows the control to be executed for the road surface on which the vehicle travels after t seconds. Thus, the controller 5 calculates beforehand the corresponding-position state amount after t seconds by using the unsprung state amount (the road surface information) at a predicted passage position of the vehicle and controls the active suspension 3 based on the corresponding-position state amount at timing when the vehicle passes the predicted passage location.

According to the vehicle control device 1A including the road surface information obtaining device 6, the active suspension 3 can be controlled based on the vibration state of the seat 2 predicted based on the road surface information, thus enabling improved control response. The estimation of the state amount by the road surface information obtaining device 6 enables a feedforward control. For instance, the vibration input timing and the control timing can be matched based on the vehicle speed and the time of arrival (t) at the expected road surface.

First Modification of Road Surface Information Obtaining Device

Figure 6:
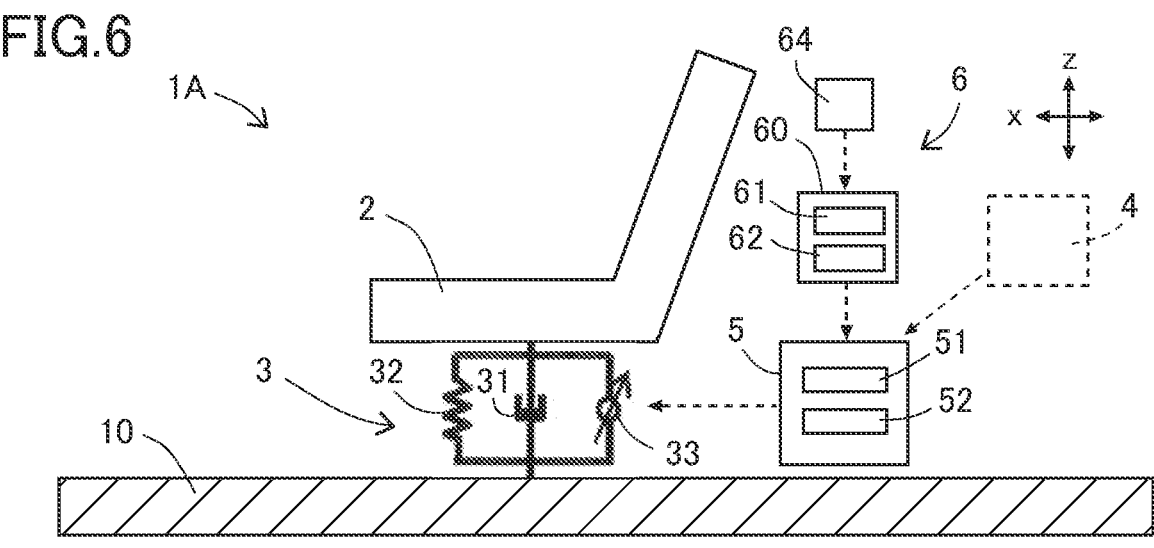
FIG. 6 is a view illustrating a configuration of the control device including a road surface information obtaining device in the embodiment.

The road surface information obtaining device 6 described above includes the ECU 60 and the receiver 63. The road surface information obtaining device 6 may be configured otherwise. As illustrated in FIG. 6, the road surface information obtaining device 6 may include a surroundings monitoring device 64 and the ECU 60 including at least one processor 61 and at least one memory 62. The surroundings monitoring device 64 includes at least one of a light detection and ranging or laser imaging detection and ranging (LiDAR) device, a camera, and a millimeter wave radar. In other words, the surroundings monitoring device 64 includes at least one preview sensor. The surroundings monitoring device 64 detects the road surface condition around the own vehicle and transmits the detection result to the ECU 60. The surroundings monitoring device 64 detects, for instance, the presence or absence of unevenness on the road surface, a height or a depth of the unevenness (i.e., the displacement amount of the road surface), a distance between the unevenness and the own vehicle, and inclination of the road surface. Based on the vehicle speed and the distance between the vehicle and the unevenness, it is possible to calculate a time required for the vehicle to reach the unevenness. Also in this modification, all the wheels 9 are set as the subject wheels.

Based on the detection result of the surroundings monitoring device, the ECU 60 calculates the unsprung state amount, which is the state amount of the unsprung portion of the vehicle. The ECU 60 estimates the unsprung state amount after t seconds based on unevenness information of the road surface (displacement information of the road surface) on which the vehicle travels after t seconds, which is obtained by the surroundings monitoring device 64. The unsprung state amount after t seconds can be calculated based on information as to the road surface change obtained by the surroundings monitoring device and the vehicle state (such as the vehicle speed).

The ECU 60 transmits, to the controller 5, the calculated unsprung state amount after t seconds as the road surface information. As in the processes S21-S26 described above, the controller 5 calculates a future control amount of the active suspension 3 based on the road surface information (the unsprung state amount) after t seconds. This configuration also enables the feedforward control and offers advantages similar to those described above. It is noted that the ECU 60 and the controller 5 may be constituted by a common ECU.

Second Modification of Road Surface Information Obtaining Device

Figure 7:
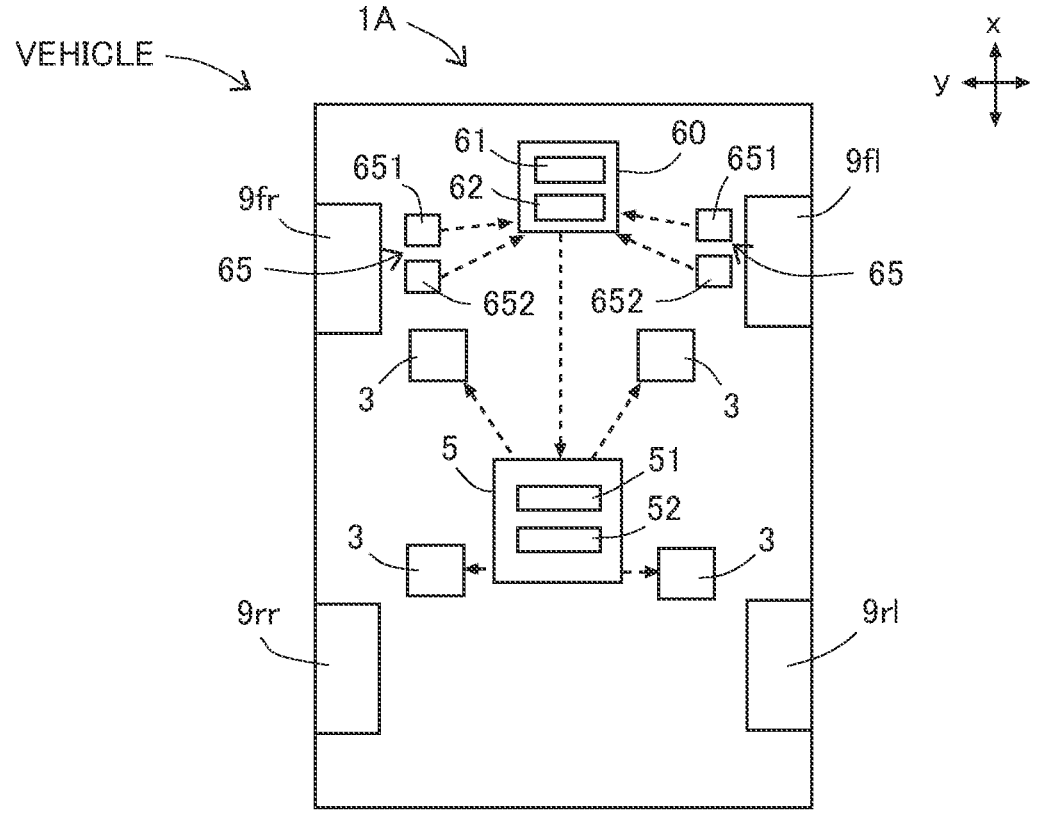
FIG. 7 is a view illustrating a configuration of the control device including the road surface information obtaining device in the embodiment.

As illustrated in FIG. 7, the road surface information obtaining device 6 may include front-wheel-state detecting devices 65 each of which detects the unsprung state amount of the corresponding front wheel 9f and the ECU 60 including at least one processor 61 and at least one memory 62. The ECU 60 calculates the unsprung state amount of each rear wheel 9r based on the unsprung state amount of each front wheel 9f. That is, the subject wheel in this modification is each of the rear wheels 9r. The front-wheel-state detecting device 65 includes a vehicle height sensor 651 provided for the front wheel 9f for detecting the vehicle height and an acceleration sensor 652 provided for part of the unsprung portion (the undercarriage components) corresponding to the front wheel 9f to detect acceleration in the up-down direction. The vehicle height sensor 651 detects the vehicle height at the position of the front wheel 9f. The acceleration sensor 652 detects the unsprung acceleration in the up-down direction at the position of the front wheel 9f.

The ECU 60 calculates the unsprung state amount of each rear wheel 9r after t seconds based on the detection results of each vehicle height sensor 651 and each acceleration sensor 652. For instance, the ECU 60 assumes that each rear wheel 9r travels in the same trajectory as the corresponding front wheel 9f and calculates the unsprung state amount of each rear wheel 9r after t seconds based on the wheel base of the vehicle and the vehicle speed. For instance, the ECU 60 can estimate that vibration generated in the front right wheel 9fr is generated in the rear right wheel 9rr after t seconds and vibration generated in the front left wheel 9fl is generated in the rear left wheel 9rl after t seconds. The ECU 60 transmits, to the controller 5, information on the unsprung state amount corresponding to the current position of each front wheel 9f and information on the unsprung state amount corresponding to the position of each rear wheel 9r after t seconds, as the road surface information.

In the body state amount calculating process S21, the controller 5 calculates the vibration state of the vehicle body 10 based on the road surface information obtained by the road surface information obtaining device 6. That is, the controller 5 calculates the vibration state (the sprung state amount) of the vehicle body 10 in a state in which the phase is advanced with respect to only the input to each rear wheel 9r. Based on the vibration state of the vehicle body 10, the controller 5 controls the active suspension 3 as in the processes S22-S26 described above. Also this configuration enables the feedforward control and offers advantages similar to those described above. It is noted that the ECU 60 and the controller 5 may be constituted by a common ECU.

Estimation of Occupant Mass

Figure 8:
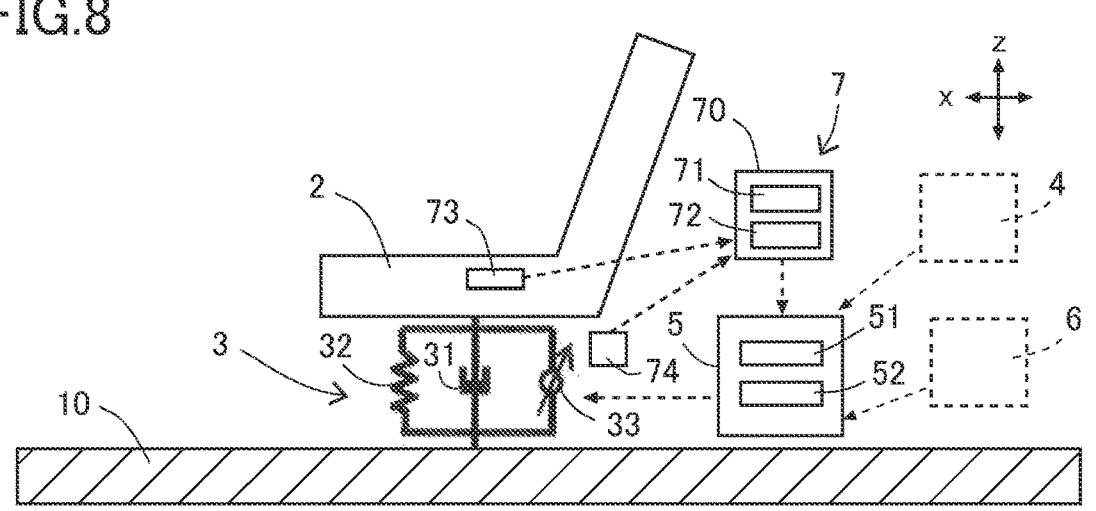
FIG. 8 is a view illustrating a configuration of the control device including a mass calculating device in the embodiment.

The vehicle control devices 1, 1A described above may further include a mass calculating device 7 configured to calculate a mass of an occupant on the carrier or an object to be conveyed on the carrier. In the present embodiment, the vehicle control devices 1, 1A include the mass calculating device 7 configured to calculate the mass of the occupant seated on the seat 2. As illustrated in FIG. 8, the mass calculating device 7 includes an ECU 70 including at least one processor 71 and at least one memory 72, a seating sensor 73, and a displacement sensor 74, which is a status sensor. The seating sensor 73 is a sensor for detecting that the occupant is seated on the seat 2. The seating sensor 73 may be a seat belt sensor for detecting that the seat belt is fastened, a capacitance type seating sensor for detecting seating of the occupant due to a change in capacitance, or a load sensor for detecting that a load is applied to the seat 2, for instance.

The displacement sensor 74 detects the displacement amount of the seat 2 in the up-down direction. The displacement sensor 74 is one example of a status sensor for detecting the status of the actuator 33. The displacement sensor 74 is provided for the actuator 33 to detect the expansion and contraction amount of the actuator 33. The controller 5 is set so as not to control the actuator 33 when the seating sensor 73 does not detect occupant's seating, namely, in a non-seating state. The ECU 70 stores, as a reference value, the detection value of the displacement sensor 74 in the non-seating state, namely, in a state in which the actuator 33 is not controlled.

When the seating sensor 73 detects occupant's seating, the ECU 70 obtains the detection value of the displacement sensor 74. The ECU 70 calculates a stroke (amount of change) of the actuator 33 due to occupant's seating based on a difference between the reference value and the detection value of the displacement sensor 74 when the occupant sits on the seat 2 (hereinafter referred to as "displacement difference" where appropriate). The ECU 70 calculates the mass of the occupant based on the stroke. The memory 72 may store mass map that is data base representing a relationship between the displacement difference and the occupant's mass. In this instance, the ECU 70 calculates the occupant's mass based on the displacement difference and the mass map. The status sensor may be an angle sensor for detecting the angle of the actuator 33 in place of the displacement sensor 74, depending on the configuration of the actuator 33. The stroke can be calculated based on the angle of the actuator 33.

The ECU 70 executes a mass calculating process S30 in which the mass of the occupant seated on the seat 2 is calculated. The ECU 70 transmits information on the calculated occupant's mass to the controller 5. The controller 5 calculates, as an estimated seat total mass $m_{see}$, a total of the occupant's mass and the mass of the seat 2 stored in advance. The ECU 70 and the controller 5 may be constituted by a common ECU.

Figure 9:
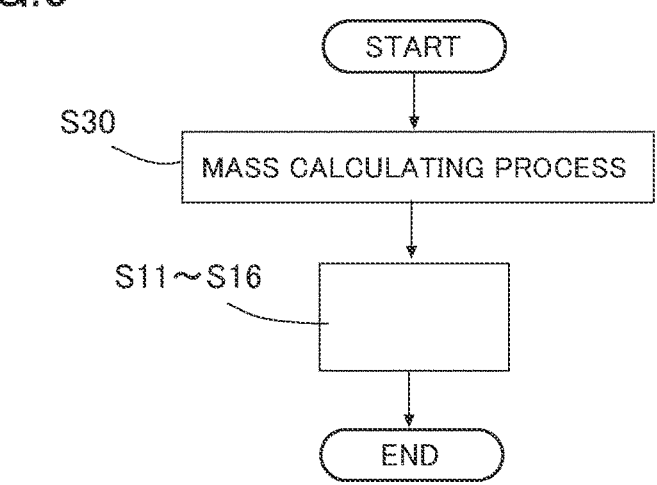
FIG. 9 is a flowchart representing processing in the embodiment.

In a case where the vehicle control device 1 equipped with the vibration detector 4 includes the mass calculating device 7, the controller 5 and the ECU 70 execute the mass calculating process S30 in addition to the processes S11-S16 as illustrated in FIG. 9. The controller 5 executes calculation according to the expressions (1)-(5) in the same manner as described above. The mass calculating process S30 is executed before the carrier state amount calculating process S13. Since the estimated seat total mass $m_{see}$ is calculated, the controller 5 executes the carrier state amount calculating process S13 using the estimated seat total mass $m_{see}$. That is, the controller 5 calculates the carrier state amount $Z_{se2}$ according to the following expression (13) where the seat total mass $m_{se}$ in the expression (6) is replaced by the estimated seat total mass $m_{see}$.

$$m_{see}z_{se2}s^2 = (c_{se}s + k_{se})(z_{se1} - z_{se2}) + F_{se} \qquad (13)$$

Thereafter, the controller 5 calculates the lower-side control amount and the upper-side control amount and a sum of the lower-side control amount and the upper-side control amount according to the expressions (7)-(9) in the same manner as described above. The controller 5 controls the active suspension 3 based on the calculation result. This enables the magnitude of the mass of the occupant seated on the seat 2 to be reflected to the control, resulting in highly accurate vibration damping control.

Figure 10:
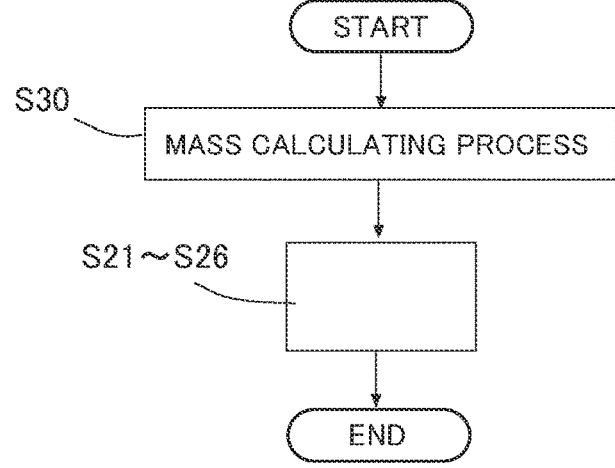
FIG. 10 is a flowchart representing processing in the embodiment.

In a case where the vehicle control device 1A equipped with the road surface information obtaining device 6 includes the mass calculating device 7, the controller 5 and the ECU 70 executes the mass calculating process S30 in addition to the processes S21-S26 as illustrated in FIG. 10. In the mass calculating process S30, the ECU 70 calculates the estimated seat total mass $m_{see}$ in the same manner as described above. The mass calculating process S30 is executed before the body state amount calculating process S21. The controller 5 obtains information on the estimated seat total mass from the mass calculating device 7. Further, the controller 5 obtains, from the road surface information obtaining device 6, the road surface information such as information on the unsprung state amount after t seconds as described above.

In the body state amount calculating process S21, the controller 5 calculates the sprung state amount after t seconds based on the unsprung state amount after t seconds. The controller 5 replaces, in the expressions (10), (11), and (12), the sprung mass $m_2$ by an estimated sprung mass $m_{2e}$, the roll moment of inertia $I_x$ of the sprung portion by an estimated roll moment of inertia $I_{xe}$ of the sprung portion, and the pitch moment of inertia $I_y$ of the sprung portion by an estimated pitch moment of inertia $I_{ye}$ of the sprung portion, so as to calculate the sprung state amount. That is, the controller 5 calculates the sprung state amount according to the following expressions (14), (15), and (16).

$$m_{2e}z_2 s^2 = (c_{sf}s + k_{sf})(z_{fl1} - z_{fl2}) + (c_{sf}s + k_{sf})(z_{fr1} - z_{fr2}) + \tag{14}$$
$$(c_{sr}s + k_{sr})(z_{rl1} - z_{rl2}) + (c_{sr}s + k_{sr})(z_{rr1} - z_{rr2})$$

$$I_{ye}\theta s^2 = -\{(c_{sf}s + k_{sf})(z_{fl1} - z_{fl2}) + (c_{sf}s + k_{sf})(z_{fr1} - z_{fr2})\}l_f + \tag{15}$$
$$\{(c_{sr}s + k_{sr})(z_{rl1} - z_{rl2}) + (c_{sr}s + k_{sr})(z_{rr1} - z_{rr2})\}l_r$$

$$I_{xe}\varphi s^2 = \{(c_{sf}s + k_{sf})(z_{fl1} - z_{fl2}) - (c_{sf}s + k_{sf})(z_{fr1} - z_{fr2})\}T_f + \tag{16}$$
$$\{(c_{sr}s + k_{sr})(z - rl1 - z_{rl2}) - (c_{sr}s + k_{sr})(z_{rr1} - z_{rr2})\}T_r$$

The estimated sprung mass $m_{2e}$ is calculated based on the occupant's mass calculated in the mass calculating process S30 and the predetermined sprung mass. The estimated roll moment of inertia $I_{xe}$ is calculated based on the estimated sprung mass $m_{2e}$ and the specification information. The estimated pitch moment of inertia $I_{ye}$ is calculated based on the estimated sprung mass $m_{2e}$ and the specification information. That is, the calculation result according to the expressions (14)-(16), namely, the sprung state amount, is a value that takes account of the calculated occupant's mass.

In the same manner as described above, the controller 5 calculates, as the sprung state amount, the sprung displacement amount $Z_2$, the sprung pitch angle $\theta$, the sprung roll angle $\varphi$, the sprung speed $Z_2 s$ in the up-down direction, the sprung acceleration $Z_2 s^2$ in the up-down direction, the sprung pitch speed $\theta s$, the sprung pitch acceleration $\theta s^2$, the sprung roll speed $\varphi s$, the sprung roll acceleration $\varphi s^2$, the displacement amount $Z_{fr2}$ of the portion of the sprung portion corresponding to the position of the front right wheel 9fr, the displacement amount $Z_{fl2}$ of the portion of the sprung portion corresponding to the position of the front left wheel 9fl, the displacement amount $Z_{rr2}$ of the portion of the sprung portion corresponding to the position of the rear right wheel 9rr, and the displacement amount $Z_{rl2}$ of the portion of the sprung portion corresponding to the position of the rear left wheel 9rl.

Based on the calculated values, the controller 5 calculates the state amount at the seat corresponding position, namely, the acceleration $Z_{se1}"$ in the z direction at the seat corresponding position, according to the expression (5) assuming that the vehicle body 10 is a rigid body. As described above, $Z_g"$ is calculated based on $Z_2$, $Z_{fr2}$, $Z_{fl2}$, $Z_{rr2}$, and $Z_{rl2}$. $\Phi_g$ corresponds to $\varphi s^2$ calculated as described above. $\Theta_g$ corresponds to $\theta s^2$ calculated as described above. Thus, the acceleration $Z_{se1}"$ of the seat corresponding position, the speed $Z_{se1}'$ of the seat corresponding position, and the displacement amount $Z_{se1}$ of the seat corresponding position are calculated as the corresponding-position state amount. Subsequent processes are the same as the processes S13-S16.

This configuration allows the control that takes account of the mass of the occupant on the seat 2, resulting in an improved accuracy of the vibration damping control of the active suspension 3. The influence degree of the magnitude of the mass of the occupant on the seat 2 is small with respect to the control of the undercarriage suspension since the mass of the vehicle body 10 is large, but the influence degree is not small with respect to the control of the active suspension 3 of the seat 2 that is considerably lighter than the vehicle body 10. It is accordingly possible to improve the control accuracy by calculating the mass of the occupant on the seat 2 and reflecting the calculated value in the control calculation.

The controller 5 may change gains $\alpha_1$, $\alpha_2$, $\beta_1$, $\beta_2$ in the expressions (7) and (8) based on the calculated occupant's mass. This enables optimum gains to be set in accordance with the occupant's mass.

As long as the mass calculating device 7 or the mass calculating process S30 is capable of calculating the mass of the occupant on the seat 2, the configuration of the mass calculating device 7 or the processing details of the mass calculating process S30 are not limited to that described above. In a case where a sensor is disposed on the seat 2, for instance, the controller 5 causes the actuator 33 to apply, to the seat 2, predetermined input such as stepwise input, random input, or sine wave. The controller 5 performs identification based on the response on the seat 2 to the input, namely, based on the detection value of the sensor on the seat 2. This makes it possible to measure the roll moment of inertia and the pitch moment of inertia, which are difficult to be statically measured. Even in a case where the vibration application processing by the actuator 33 is not performed, the controller 5 may perform identification by referring to a transfer function on the seat 2 with respect to the input from the vehicle body 10 or by simply referring to a peak frequency of the vibration on the seat 2.

Modifications

The present disclosure is not limited to the details of the illustrated embodiment. For instance, the vehicle control device may include both the vibration detector 4 and the road surface information obtaining device 6. In this instance, the controller 5 may calculate the control amount $F_{se}$ by adding the control amount $F_{se1}$ calculated by one of the processes S11-16 and the processes S21-26 and the control amount $F_{se2}$ calculated by the other. In this instance, however, it is preferable that a value obtained by adding the gain $\alpha_1$ and the gain $\beta_1$ does not largely exceed an ideal gain as for the lower side control amount $F_{se1}$. If each gain $\alpha_1$, $\beta_1$ is set to a value greater than a gain that ideally cancels the vibration, the seat 2 may be undesirably vibrated in a direction opposite to the vibration. It is noted that there are no constraints to gains when the processing including the mass calculating process S30 is executed as described above.

When the preview vibration damping control is executed for the undercarriage suspension, the active suspension 3 is controlled in consideration of the preview vibration damping control. The term "ECU" in the present disclosure can be replaced with "computer". The "calculation" can be referred to as "estimation". The roll speed is referred to as a roll angle speed, the pitch speed is referred to as a pitch angle speed, the roll acceleration is referred to as roll angle acceleration, and the pitch acceleration is referred to as pitch angle acceleration. The active suspension 3 need not necessarily include the actuator 33. In this case, the controller 5 controls at least one of the damping force and the spring constant. The controller 5 may be constituted by a plurality of ECUs. The model set in calculation is changeable depending on the seat structure or the processing capability of ECU. The vibration detector 4 may be a computing device (such as ECU) that calculates the vibration state of the vehicle body 10 based on the road surface information obtained by the road surface information obtaining device 6. The processor is one example of a computing device, and the memory (such as ROM or RAM) is one example of a storage device. The road surface information needs to include information on the displacement of the road surface in the up-down direction (such as displacement, a speed, and acceleration) and may be information on road surface unevenness, road surface inclination, road surface displacement, unsprung displacement or tire displacement.

What is claimed is:

1. A control device for a vehicle, comprising:
a carrier installed on a vehicle and on which an occupant or an object to be conveyed is placed;
an active suspension disposed between the carrier and a body of the vehicle and capable of controlling a force that acts between the carrier and the vehicle body;
a vibration detector configured to detect a vibration state of the vehicle body; and
a controller configured to calculate, based on a detection result of the vibration detector, a corresponding-position state amount indicating the vibration state of a portion of the vehicle body corresponding to a position where the carrier is disposed and control the active suspension based on the corresponding-position state amount,
wherein the vibration detector includes three acceleration sensors each configured to detect acceleration in an up-down direction of the vehicle,
wherein the three acceleration sensors are disposed on the vehicle body so as to be spaced apart from each other,
wherein the controller is configured to calculate acceleration in the up-down direction at the center of gravity of the vehicle body, roll acceleration at the center of gravity of the vehicle body, and pitch acceleration at the center of gravity of the vehicle body, based on positions and detection results of the respective three acceleration sensors, and
wherein the controller is configured to calculate, as the corresponding-position state amount, acceleration in the up-down direction of the portion of the vehicle body corresponding to the position where the carrier is disposed, based on the acceleration in the up-down direction at the center of gravity of the vehicle body, the roll acceleration at the center of gravity of the vehicle body, the pitch acceleration at the center of gravity of the vehicle body, a position of the carrier, and a position of the center of gravity of the vehicle body.

2. The control device according to claim 1,
wherein the controller is configured to:
calculate a lower-side control amount, which is a control amount of the active suspension to deal with a vibration input from the vehicle body to the carrier, based on the corresponding-position state amount and a predetermined lower-side gain; and
control the active suspension based on the lower-side control amount.

3. The control device according to claim 1,
wherein the controller is configured to:
calculate a carrier state amount indicating the vibration state of the carrier based on the corresponding-position state amount; and
control the active suspension based on the carrier state amount.

4. The control device according to claim 3,
wherein the controller is configured to:
calculate an upper-side control amount, which is a control amount of the active suspension to deal with a vibration of the carrier, based on the carrier state amount and a predetermined upper-side gain; and
control the active suspension based on the upper-side control amount.

5. The control device according to claim 4,
wherein the controller is configured to:
calculate a lower-side control amount, which is the control amount of the active suspension to deal with a vibration input from the vehicle body to the carrier, based on the corresponding-position state amount and a predetermined lower-side gain; and
control the active suspension based on the lower-side control amount and the upper-side control amount.

6. The control device according to claim 1, wherein the three acceleration sensors are disposed at a front right portion of the vehicle body, a front left portion of the vehicle body, and at a rear right portion or a rear left portion of the vehicle body, and
wherein a plurality of carriers are provided, and
the controller is configured to calculate the corresponding-position state amount of each of the plurality of carriers, respectively, in accordance with respective positions of the three acceleration sensors, based on the detection result of the vibration detector.

* * * * *